(12) United States Patent
Jung (10) Patent No.: US 11,392,253 B2
(45) Date of Patent: Jul. 19, 2022

(54) TOUCH SENSING DEVICE FOR SENSING ACTIVE PEN AND TOUCH SENSING SYSTEM INCLUDING THE SAME

(71) Applicant: SILICON WORKS CO., LTD., Daejeon (KR)

(72) Inventor: Youn Ho Jung, Daejeon (KR)

(73) Assignee: SILICON WORKS CO., LTD., Daejeon (KR)

(*) Notice: Subject to any disclaimer, the term of this patent is extended or adjusted under 35 U.S.C. 154(b) by 0 days.

(21) Appl. No.: 17/171,350

(22) Filed: Feb. 9, 2021

(65) Prior Publication Data
US 2021/0255729 A1     Aug. 19, 2021

(30) Foreign Application Priority Data
Feb. 14, 2020   (KR) .................... 10-2020-0018486

(51) Int. Cl.
*G06F 3/044*   (2006.01)
*G06F 3/041*   (2006.01)

(52) U.S. Cl.
CPC .......... *G06F 3/0442* (2019.05); *G06F 3/0416* (2013.01)

(58) Field of Classification Search
None
See application file for complete search history.

(56) References Cited

U.S. PATENT DOCUMENTS

| 8,681,126 | B2 | 3/2014 | Keam |
| 9,836,158 | B2 | 12/2017 | King et al. |
| 2019/0235649 | A1* | 8/2019 | Oyama ................. G06F 3/0442 |
| 2020/0081577 | A1* | 3/2020 | Nomura ................. G06F 3/0441 |

FOREIGN PATENT DOCUMENTS

KR         10-1542799 B1     8/2015

* cited by examiner

*Primary Examiner* — Stephen T. Reed
(74) *Attorney, Agent, or Firm* — Fenwick & West LLP (57) ABSTRACT

The present disclosure allows increasing the sensing sensitivity or the perception rate for a hovering active pen using a threshold value.

13 Claims, 5 Drawing Sheets

| 15 | -33 | 26 | 25 | 20 | 18 | -41 | -43 |
|---|---|---|---|---|---|---|---|
| 20 | -34 | 25 | -40 | 33 | -53 | -48 | 17 |
| -34 | -46 | 21 | 17 | -40 | 13 | 19 | 11 |
| 17 | -40 | 16 | -33 | 30 | -22 | 17 | -45 |
| -39 | -42 | 16 | 16 | -32 | -13 | -9 | 17 |

420 →

| 0 | 1 | 0 | 0 | 0 | 0 | 1 | 1 |
|---|---|---|---|---|---|---|---|
| 0 | 1 | 0 | 1 | 0 | 1 | 1 | 0 |
| 1 | 1 | 0 | 0 | 1 | 0 | 0 | 0 |
| 0 | 1 | 0 | 1 | 0 | 2 | 0 | 1 |
| 1 | 1 | 0 | 0 | 1 | 2 | 2 | 0 |

430 →

| - | - | 1/0 | - | 1/0 | - | 0/1 | 0/1 |
|---|---|---|---|---|---|---|---|
| - | - | 1 | 0 | 1/0 | 0/1 | - | - |
| - | - | - | - | - | - | - | - |
| - | - | - | - | - | - | - | - |
| - | - | - | - | - | - | - | - |

440 →

|  |  | 35 |  | 29 |  | -32 | -34 |
|---|---|---|---|---|---|---|---|
|  |  | 34 | -31 | 42 | -44 |  |  |
|  |  |  |  |  |  |  |  |
|  |  |  |  |  |  |  |  |
|  |  |  |  |  |  |  |  |

*FIG. 5*

TOUCH SENSING DEVICE FOR SENSING ACTIVE PEN AND TOUCH SENSING SYSTEM INCLUDING THE SAME

CROSS REFERENCE TO RELATED APPLICATION

This application claims priority from Republic of Korea Patent Application No. 10-2020-0018486, filed on Feb. 14, 2020, which is hereby incorporated by reference in its entirety.

BACKGROUND

1. Field of Technology

The present disclosure relates to a technique for sensing a hovering active pen and to a touch sensing system.

2. Description of the Prior Art

A technology for perceiving a touch or the proximity of an external object to a touch panel is called a touch sensing technology. In an electronic apparatus using such a technology, a touch panel is positioned in the same plane as that of a display panel, and accordingly, a user may input user operation signals into the touch panel while the user looks at images on the display panel. Such a method of generating user operation signals is remarkably intuitive for users compared with previous other user operation signal input types, such as a mouse input type or a keyboard input type.

For such advantages, the touch sensing technology is applied to various electronic apparatuses comprising display panels. A touch sensing device may sense a touch or the proximity of an external object to a touch panel by supplying a driving signal to a driving electrode disposed in the touch panel and receiving a response signal formed in a sensing electrode disposed therein. Here, a capacitance is formed between the driving electrode and the sensing electrode and the change of the capacitance may indicate a touch or the proximity of the external object to the touch panel.

A user may use an active pen as well as a finger in order to input a user operation signal. Depending on the user's way of use, the active pen may touch or approach a touch panel. "Touching" may mean that the active pen is practically in contact with a surface of the touch panel and "approaching" may mean that the active pen is in the proximity of the surface of the touch panel, that is, the active pen is within a predetermined distance from the surface of the touch panel without being practically in contact with the touch panel. Regardless of a touch or the proximity of the active pen to the touch panel, the capacitance of a touch electrode may be changed. However, the degree of the change is not very significant in a case of the proximity, whereas it is in case of a touch. In other words, a sensing signal of the active pen may be much weaker in case of the proximity than in case of a touch. A weak sensing signal may cause a decrease of the sensing sensitivity or the perception rate of an active pen.

Meanwhile, an active pen may hover over a touch panel. Similar to the case of proximity, the active pen may be positioned to be spaced apart by a predetermined distance from the touch panel in a case of hovering. Nevertheless, since, when an active pen is hovering, the active pen provides a touch signal without being in contact with the surface of the touch panel by a user's intention, the case of hovering may be different from the case of proximity when strictly speaking. A sensing signal of a hovering active pen may be much weaker than a sensing signal of an active pen in touch. A weak sensing signal may cause a decrease of the sensing sensitivity or the perception rate of a hovering active pen.

SUMMARY

Accordingly, the present disclosure is to provide a technique for increasing the sensing sensitivity or the perception rate of a hovering active pen.

An aspect of the present disclosure is to provide a technique for sensing a hovering active pen by calculating a threshold value.

Another aspect of the present disclosure is to provide a technique for sensing a hovering active pen by summing up sensing values of a plurality of touch electrodes included in one touch area to calculate a threshold value.

To this end, in an aspect, the present disclosure provides a touch sensing device receiving information of an active pen, comprising: a sensing circuit to output sensing values of respective touch electrodes for a downlink signal of the active pen; a summing up circuit to calculate a sum value by summing up a plurality of sensing values; an average value calculating circuit to calculate an average value by averaging a plurality of sum values respectively calculated in different signal sections; a deviation calculating circuit to calculate deviations between the plurality of sum values and the average value; a threshold value calculating circuit to calculate at least one threshold value using the deviations and the average value; and a controlling circuit to identify a value of the downlink signal in each signal section by comparison between each sum value and the at least one threshold value and to identify the information of the active pen using signal values in a plurality of signal sections.

The sensing circuit may output the sensing values when the active pen hovers.

The at least one threshold value may comprise a first threshold value which is positive and a second threshold value which is negative.

The threshold value calculating circuit may calculate a threshold deviation value using an average of absolute values of the deviations and calculate the first threshold value by summing up the average value and the threshold deviation value.

The threshold value calculating circuit may calculate a threshold deviation value using an average of absolute values of the deviations and calculate the second threshold value by obtaining a difference between the average value and the threshold deviation value.

The deviations may comprise positive deviations having positive values and negative deviations having negative values and the threshold value calculating circuit may calculate the at least one threshold value by using an average of absolute values of the positive deviations and absolute values of the negative deviations.

The sum values may comprise positive sum values which are positive and negative sum values which are negative and the average value calculating circuit may calculate the average value by averaging the same numbers of positive sum values and negative sum values.

The average value calculating circuit may calculate the average value using the sum values in the signal sections having fixed signal values or predictable signal values.

In another aspect, the present disclosure provides a touch sensing system comprising: a panel on which touch electrodes are disposed; an active pen touching or approaching the panel; and a touch sensing device to output sensing values of the touch electrodes for a downlink signal of the active pen and to identify a value of the downlink signal using the sensing values and at least one threshold value, wherein the touch sensing device calculates a sum value by summing up a plurality of sensing values and compares the sum value and the at least one threshold value so as to identify the value of the downlink signal.

The touch sensing device may calculate an average value by averaging a plurality of sum values, calculate deviations between the plurality of sum values and the average value, and calculate at least one threshold value according to an average of the deviations.

The at least one threshold value may comprise a first threshold value which is positive and a second threshold value which is negative.

The active pen may hover over the panel.

The touch electrodes may be disposed in the form of a matrix so as to form a plurality of touch areas.

The plurality of sum values may respectively be obtained in different signal sections.

The touch sensing device may calculate the sum value by summing up sensing values of N (N is a natural number, which is 2 or greater) adjacent touch electrodes.

As described above, the present disclosure allows increasing the sensing sensitivity or the perception rate for a hovering active pen using a threshold value and this increase of the sensing sensitivity for a hovering active pen allows speeding up the touch sensing and improving the convenience of use.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
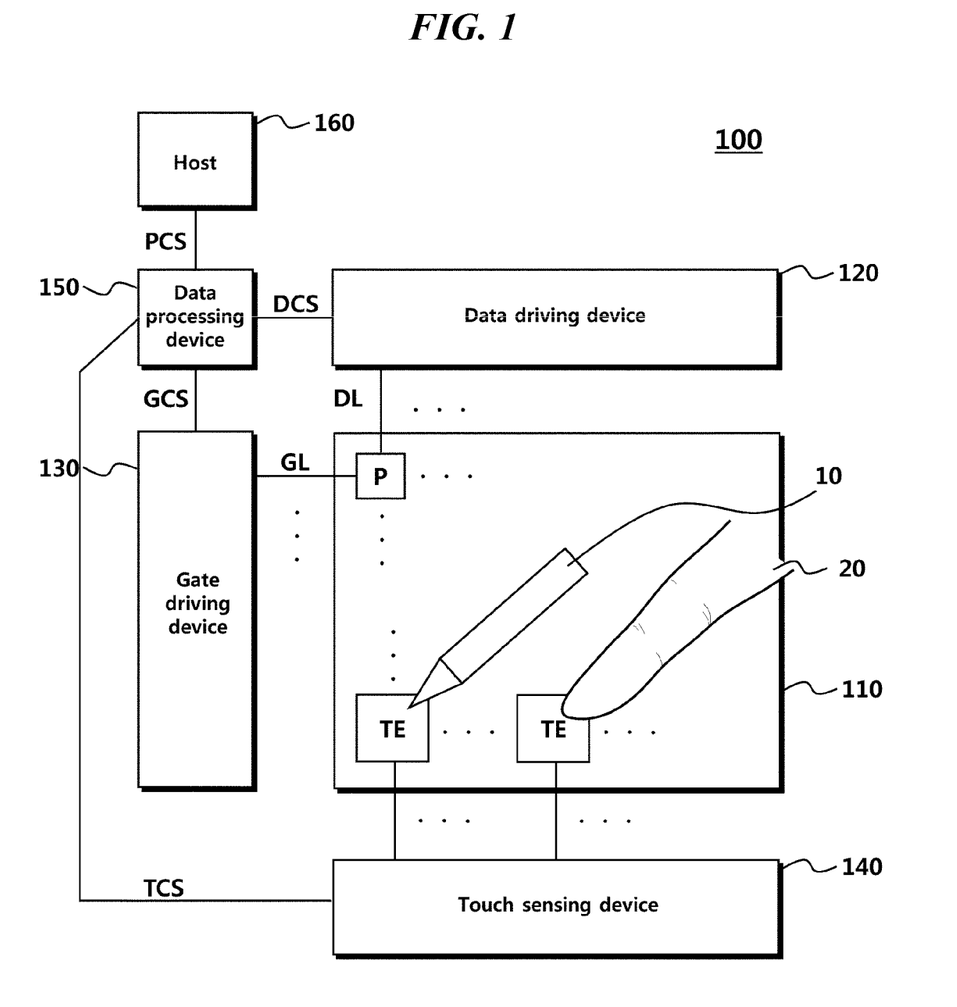
FIG. 1 is a configuration diagram of a display device according to an embodiment.

FIG. 1 is a configuration diagram of a display device 100 according to an embodiment.

Referring to FIG. 1, a display device 100 may comprise a panel 110, a data driving device 120, a gate driving device 130, a touch sensing device 140, a data processing device 150, and a host 160.

At least one of the data driving device 150, the gate driving device 130, the touch sensing device 140, and the data processing device 150 may be referred to as a display driving device. For example, the data driving device 120 may be referred to as a display driving device or a driving device including the data driving device 120 and the touch sensing device 140 may be referred to as a display driving device. One driving device may be included in another driving device. For example, the data driving device 120 may be included in the touch sensing device 140 or the gate driving device 130 may be included in the data driving device 120. Depending on embodiments, only some of components of one driving device may be included in another driving device.

The data driving device 120 may drive data lines DL connected with pixels P and the gate driving device 130 may drive gate lines GL connected with pixels P. The touch sensing device 140 may drive touch electrodes TE disposed on the panel 110.

The data driving device 120 may supply a data voltage to a pixel P through a data line DL so as to display an image. The data driving device 120 may comprise at least one integrated circuit, and this at least one integrated circuit may be connected to a bonding pad of a display panel 110 in a tape automated bonding (TAB) type or a chip-on-glass (COG) type, directly formed on a display panel 110, or integrated on a display panel 110 depending on cases. In addition, the data driving device 120 may be formed in a chip-on-film (COF) type.

The data driving device 120 may receive image data and a data control signal DCS from the data processing device 150. The data driving device 120 may generate a data voltage according to a greyscale value of a pixel indicated by the image data and drive the pixel.

The data control signal DCS may comprise at least one synchronization signal. For example, a data control signal DCS may comprise a vertical synchronization signal VSYNC, a horizontal synchronization signal HSYNC, and a time division signal. The data driving device 120 may identify the division of frames indicated by the vertical synchronization signal and pixels may be driven in sections other than vertical blank sections indicated by the vertical synchronization signal. The data driving device 120 may identify image data for each horizontal line of pixels according to the horizontal synchronization signal and supply data voltages to pixels by horizontal line. The data driving device 120 may identify the division of a display section and a touch section indicated by the time division signal and drive pixels in the display section.

The gate driving device 130 may supply a scan signal to a pixel P through a gate line GL so as to turn on or off a transistor disposed in the pixel P. Depending on a driving method, the gate driving device 130 may be disposed at one side of the panel 110 as shown in FIG. 1 or may be divided into two and disposed at both sides of the penal 110. The gate driving device 130 may comprise at least one integrated circuit, and this at least one integrated circuit may be connected to a bonding pad of a display panel 110 in a tape automated bonding (TAB) type or a chip-on-glass (COG) type, directly formed on a display panel 110, or integrated on a display panel 110 depending on cases. In addition, the gate driving device 130 may be formed in a chip-on-film (COF) type.

The gate driving device 130 may receive a gate control signal GCS from the data processing device 150. The gate control signal GCS may comprise a plurality of clock signals. The gate driving device 130 may generate a scan signal using a clock signal and supply the scan signal to a gate line GL.

The panel 110 may comprise a display panel and a touch panel (or a touch screen panel) as well. The display panel and the touch panel may share some components. For example, a touch electrode TE of the touch panel for sensing a touch may be used as a common electrode, to which a common voltage is supplied, in the display panel in a case when the display panel is a liquid crystal display (LCD) panel. For another example, a touch electrode TE may be used as a cathode electrode, to which a base voltage is supplied, in the display panel in a case when the display panel is an organic light emitting diode (OLED) panel. Such a panel 110 may be called "an integrated panel", considering that some components are shared by the display panel and the touch panel. However, the present disclosure is not limited thereto. In addition, an in-cell type panel, in which a display panel and a touch panel are integrally combined, is known, but this is only an example of the above-described panel 110. A panel, to which the present disclosure is applied, is not limited to the in-cell type panel.

On the panel 110, a plurality of touch electrodes TE are disposed and the touch sensing device 140 may drive a touch electrode TE using a touch driving signal. The touch sensing device 140 may generate a sensing value of a touch electrode according to a response signal formed in the touch electrode TE in response to the driving signal. The touch sensing device 140 may calculate touch coordinates of an object 20 using sensing values of a plurality of touch electrodes TE disposed on the panel 110 and the calculated touch coordinates may be transmitted to another device, for example, the host 160.

The touch sensing device 140 may transmit or receive a signal to or from an active pen 10 through a touch electrode TE. The touch sensing device 140 may supply an uplink signal to a touch electrode TE and the active pen 10 may receive the uplink signal by a contact with or an approach to the touch electrode TE. The uplink signal may comprise information such as panel information, the version of a protocol, or the like or a synchronization signal. The active pen 10 may identify the panel information or the version of the protocol or synchronize a signal by the received uplink signal.

The active pen 10 may transmit a downlink signal to a touch electrode TE. The touch sensing device 140 may receive the downlink signal through the touch electrode TE. A downlink signal may include state information of the active pen. The state information of the active pen may include, for example, the location of the active pen, the state of the active pen's button, the state of the active pen's battery, the tilt degree of the active pen, or the like.

The active pen 10 may transmit downlink signals in different signal sections. One frame may comprise a display section and a touch section and a touch section may comprise a plurality of signal sections. The active pen 10 may transmit downlink signals to touch electrodes TE disposed on the panel 110 in downlink signal sections among the plurality of signal sections.

A downlink signal received in one downlink signal section may have one signal value. For example, a downlink signal may have a signal value of 1 or a signal value of 0 in one downlink signal section, or a downlink signal may have a signal value of 2 in one downlink signal section. The touch sensing device 140 may identify information of the active pen by checking signal values in different signal sections.

The touch sensing device 140 may receive a touch control signal TCS from the data processing device 150. A touch control signal TCS may include at least one synchronization signal. For example, a touch control signal TCS may include a vertical synchronization signal VSYNC, a time division signal, a touch synchronization signal TSYNC, or the like. The touch sensing device 140 may identify the division of a display section and a touch section indicated by the time division signal or the touch synchronization signal TSYNC and drive a touch electrode TE in the touch section.

Synchronization signals may be the same or different from each other depending on embodiments. For example, the time division signal may be the same as the touch synchronization signal or different therefrom. Although descriptions of the synchronization signals will be made below using specific names in order to emphasize their specific functions, the present disclosure is not limited to such specific names.

Fundamentally, synchronization signals may be generated on the basis of a panel control signal PCS supplied from the host 160 to the data processing device 150.

The host 160 may transmit image data to the data processing device 150 and a vertical synchronization signal VSYNC for indicating the division of the image data by frame. The data processing device 150 may generate a time division signal or a touch synchronization signal TSYNC on the basis of the vertical synchronization signal VSYNC and transmit them to the driving devices 120, 130, 140.

Figure 2:
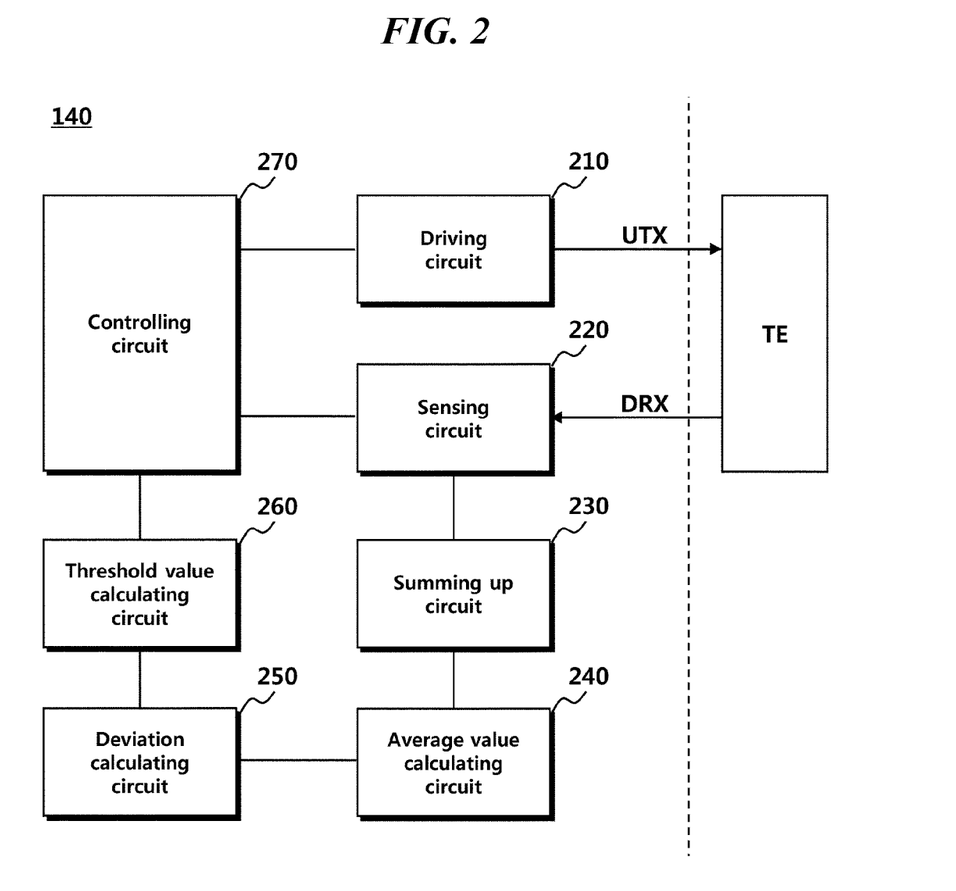
FIG. 2 is a configuration diagram of a touch sensing device according to an embodiment.

FIG. 2 is a configuration diagram of a touch sensing device 140 according to an embodiment.

Referring to FIG. 2, the touch sensing device 140 may comprise a driving circuit 210, a sensing circuit 220, a summing up circuit 230, an average value calculating circuit 240, a deviation calculating circuit 250, a threshold value calculating circuit 260, and a controlling circuit 270. The touch sensing device 140, touch electrodes TE, and an active pen may form a touch sensing system.

A touch electrode TE may be a common electrode to which a common voltage is supplied in an LCD panel or a touch electrode TE may be a cathode electrode of an OLED panel.

The driving circuit 210 may supply an uplink transmission signal UTX to a touch electrode TE in a first time section. Here, the uplink transmission signal UTX is an uplink signal formed in the touch electrode TE. An active pen may receive the uplink signal from the touch electrode TE. The uplink signal formed in the active pen may be referred to as an uplink reception signal.

The sensing circuit 220 may receive a downlink reception signal DRX from the touch electrode TE in a second time section that does not overlap with the first time section. Here, the downlink reception signal DRX is a downlink signal formed in the touch electrode TE. The active pen may transmit a downlink signal to the touch electrode TE. The downlink signal formed in the active pen may be referred to as a downlink transmission signal.

When the active pen receives an uplink signal and transmits a downlink signal corresponding to the uplink signal to the touch sensing device 140 through a touch electrode TE, the sensing circuit 220 may output a sensing value including information of the active pen.

Here, a sensing value may be the size or the variance of a capacitance formed between the touch electrode TE and a tip of the active pen when the active pen touches or approaches the touch electrode TE or the variance of a current or of an electric charge formed in the touch electrode TE by the downlink signal. When the sensing circuit 220 transmits the sensing value to the controlling circuit 270, the controlling circuit 270 may determine a touch or the proximity of the active pen by the size of the capacitance included in the sensing value and identify a signal value in each signal section using the sensing value.

Whenever the sensing circuit 220 receives a downlink signal including information about the active pen, such as its location, tilt degree, pen pressure, identifier, and battery state, the sensing value for the touch electrode may vary.

The touch sensing device 140 may determine a touch or the proximity of the active pen or identify the signal value by comparing the sensing value and a threshold value. For example, the touch sensing device 140 considers a sensing value of a touch electrode to be valid only when the sensing value exceeds the threshold value and determines that there is a touch of the active pen. Additionally, the touch sensing device 140 may determine the signal value as 0 when a sensing value is equal to or higher than a first threshold value which is positive, determine the signal value as 1 when a sensing value is equal to or lower than a second threshold value which is negative, and determine the signal value as 2 when a sensing value is less than the first threshold value and greater than the second threshold value.

When the active pen 10 hovers, the touch sensing device 140 may calculate a new threshold value and compare a sensing value with the new threshold value so as to determine a touch or the proximity of the active pen or identify a signal value.

Specifically, the touch sensing device 140 may output a plurality of sensing values of a plurality of touch electrodes included in a plurality of touch areas and calculate a sum value for each touch area by summing up a plurality of sensing values. Then, the touch sensing device 140 may calculate a plurality of sum values in a plurality of signal sections, calculate an average value from the plurality of sum values, and calculate a threshold value using the average value so as to determine a touch or the proximity of the active pen 10 or identify a signal value by using the threshold value as a criterion.

The summing up circuit 230 may receive a plurality of sensing values from the sensing circuit 220 and sum up the plurality of sensing values to obtain a sum value. A panel may comprise a plurality of touch electrodes TE and some of the plurality of touch electrodes TE may form one touch area. A sensing value may relate to each touch electrode TE and a sum value may relate to one touch area comprising a plurality of touch electrodes TE. A sum value may be a value obtained by summing up all the sensing values of the plurality of touch electrodes TE in the one touch area.

The average value calculating circuit 240 may calculate an average value by averaging a plurality of sum values. One frame may comprise a plurality of signal sections. The average value calculating circuit 240 may calculate an average value by averaging sum values in some signal sections.

The sum values may comprise positive sum values which are positive or negative sum values which are negative. Regardless if a sum value is positive or negative, the average value calculating circuit 240 may calculate an average value of a plurality of sum values for a plurality of selected touch areas. In one embodiment, the average value calculating circuit 240 may calculate an average value by averaging the same number of positive sum values and negative sum values.

For example, the average value calculating circuit 240 may calculate an average value using the following Equation 1. Hereinafter, a process of calculating a threshold value using 8 sum values for 8 signal sections will be described.

$$AvgValue = \frac{\sum_{n=1}^{8} SumValue[n]}{8} \quad \text{[Equation 1]}$$

Here, the AvgValue means an average value and the SumValue means a sum value. The number of sum values required for calculating an average value is not limited to 8 and can be more or less.

The deviation calculating circuit 250 may calculate deviations using a plurality of sum values and an average value of them. The deviation calculating circuit 250 may calculate a plurality of deviations between the plurality of sum values and the average value.

For example, the deviation calculating circuit 250 may calculate a plurality of deviations using the following Equation 2.

$$StdValue = SumValue - AvgValue \quad \text{[Equation 2]}$$

Here, the StdValue means a deviation. The deviation calculating circuit 250 may calculate 8 deviations by calculating differences between an average value of 8 sum values and the respective 8 sum values.

The deviations may comprise positive deviations having positive values and negative deviations having negative values. Since the sum values may be positive or negative as described above, the deviations obtained by subtracting the average value from a sum value may have positive values or negative values.

The threshold value calculating circuit 260 may calculate at least one threshold value using the deviations and the average value. Since the deviations comprise the positive ones and the negative ones, the threshold value calculating circuit 260 may calculate a threshold value in consideration of such characteristics. Specifically, the threshold value calculating circuit 260 may calculate a sum of absolute values of the positive deviations and a sum of absolute values of the negative deviations and calculate a threshold value using an average of the absolute values of the sum of the positive deviations and the sum of the absolute values of the negative deviations.

For example, the threshold value calculating circuit 260 may calculate the sum of the positive deviations using the following Equation 3.

$$PosSum = \sum_{n=1}^{8} \begin{cases} StdValue[n] & \text{if } StdValue[n] > 0 \\ 0 & \text{otherwise} \end{cases} \quad \text{[Equation 3]}$$

Here, the PosSum means the sum of the positive deviations. The threshold value calculating circuit 260 may sum up only the positive deviations among 8 deviations.

In addition, for example, the threshold value calculating circuit 260 may calculate the sum of the negative deviations using the following Equation 4.

$$NegSum = \sum_{n=1}^{8} \begin{cases} StdValue[n] & \text{if } StdValue[n] < 0 \\ 0 & \text{otherwise} \end{cases} \quad \text{[Equation 4]}$$

Here, the NegSum means the sum of the negative deviations. The threshold value calculating circuit 260 may sum up only the negative deviations among the 8 deviations.

The threshold value calculating circuit 260 may calculate the threshold value using an average of the sum of the absolute values of the positive deviations and the sum of the absolute values of the negative deviations. For example, the threshold value calculating circuit 260 may calculate the threshold value using the following Equation 5.

$$\text{Threshold} = \frac{(PosSum - NegSum)}{16} \qquad \text{[Equation 5]}$$

Here, the Threshold means a threshold value. The threshold value calculating circuit 260 may obtain the threshold value by subtracting the sum of the negative deviations (NegSum) from the sum of the positive deviations (PosSum) and dividing the subtraction result by 16. In other words, the threshold value may be obtained by adding up a sum of absolute values of the positive deviations and a sum of absolute values of the negative deviations and obtaining an average with respect to the addition result.

In addition, the threshold value calculating circuit 260 may calculate from the threshold value a first threshold value which is positive and a second threshold value which is negative.

For example, the threshold value calculating circuit 260 may calculate the first threshold value by adding up the average value and the threshold value as described in the following Equation 6 and calculate the second threshold value by subtracting the threshold value from the average value as described in the following Equation 7.

$$\text{PosTh} = \text{AvgValue} + \text{Threshold} \qquad \text{Equation 6}$$

$$\text{NegTh} = \text{AvgValue} - \text{Threshold} \qquad \text{Equation 7}$$

Here, the PosTh means the first threshold value and the NegTh means that the second threshold value.

The controlling circuit 270 may determine a touch or the proximity of the active pen 10 or identify the signal value using the threshold value. The controlling circuit 270 may use the first threshold value and the second threshold value.

Figure 3:
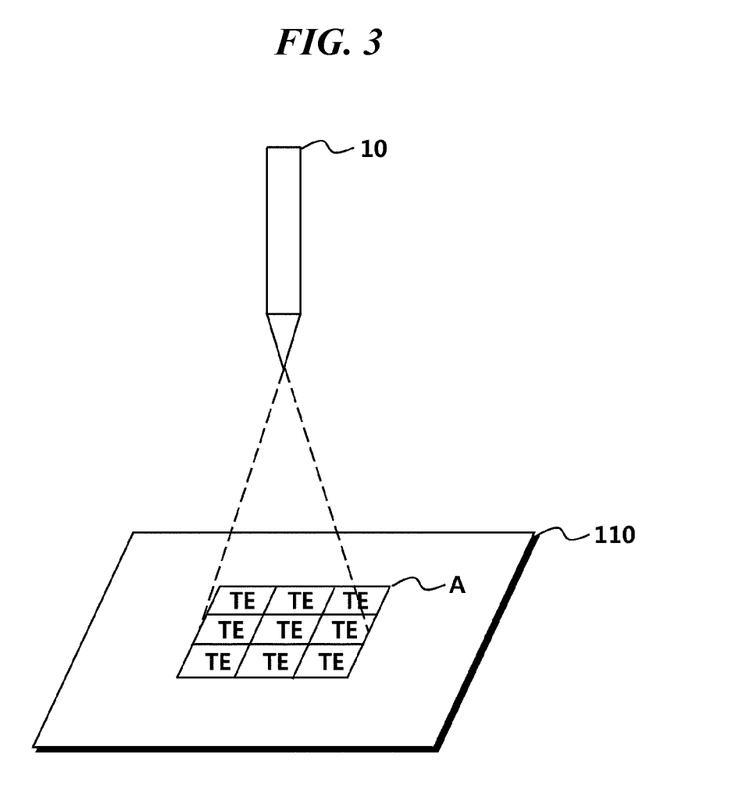
FIG. 3 is a diagram illustrating a hovering active pen and a sum value which is a base for a threshold value according to an embodiment.

FIG. 3 is a diagram illustrating a hovering active pen 10 according to an embodiment and a sum value which is a base for a threshold value according to one embodiment.

Referring to FIG. 3, when hovering, the active pen 10 may be spaced apart from the panel 110 by a predetermined distance without being in contact with the panel 110. Even when the active pen 10 hovers, the active pen 10 may transmit a downlink signal to the touch sensing device 140 through a touch electrode TE. The touch sensing device 140 may calculate a new threshold value so as to detect a weak downlink signal from the hovering active pen 10 and determine a touch or the proximity of the active pen 10 using the new threshold value as a reference.

In order to calculate the new threshold value, the touch sensing device 140 may use a sum value for one touch area A. The one touch area A may comprise a plurality of touch electrodes TE and the sum value may be a value obtained by adding up some or all of the sensing values of the touch electrodes TE.

For example, a plurality of touch electrodes TE may be disposed in the form of a 3×3 matrix and form a touch area A. Here, the touch sensing device may select 8 among 9 sensing values of 9 touch electrodes TE and calculate a sum value for the touch area A by summing up the selected 8 sensing values. The touch sensing device 140 may also calculate sum values for other touch areas than the touch area A in the panel 110.

Figure 4:
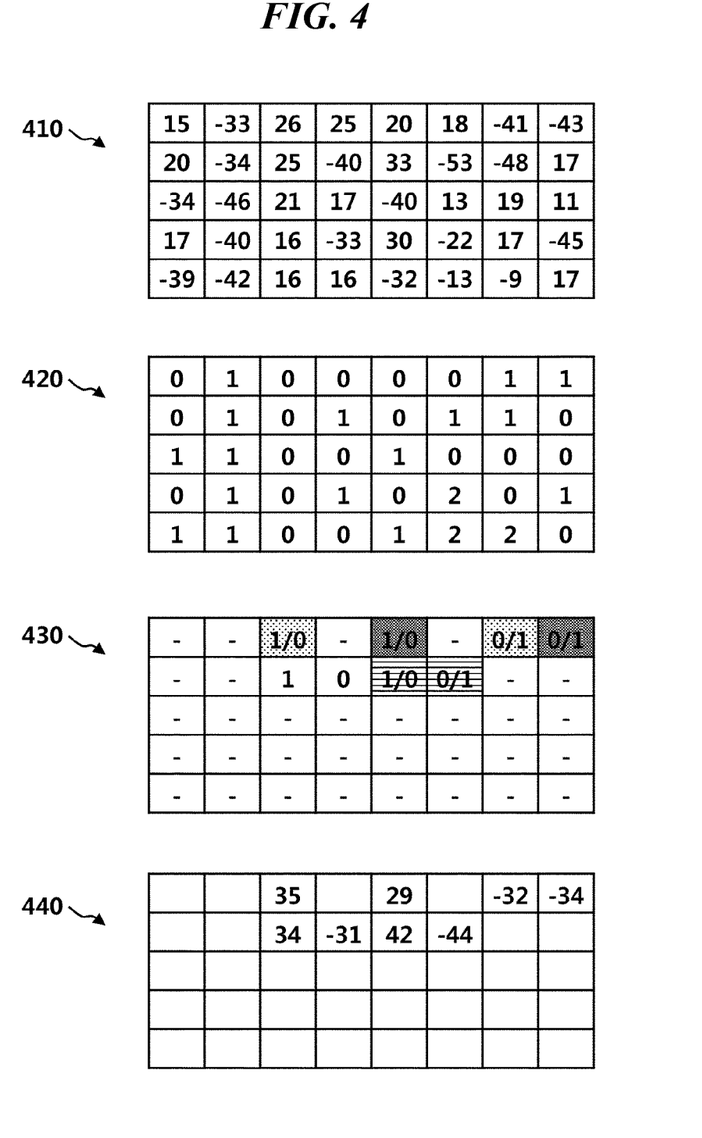
FIG. 4 is an example showing a process in which a touch sensing device calculates sum values and a threshold value according to an embodiment.

FIG. 4 is an example showing a process that a touch sensing device 140 calculates sum values and a threshold value.

FIG. 4 shows an example in which the touch sensing device 140 calculates a threshold value from arbitrary sum values. Sum values in a plurality of signal sections for one touch area may be represented by values in tables 1 to 4 (410-440).

For example, a frame may comprise total of 40 (=8×5) signal sections and table 1 410 may show sum values in theses signal sections. The sum values may comprise positive sum values which are positive and negative sum values which are negative.

Table 2 420 may show values substituting for the sum values according to properties of the sum values. For example, when a sum value is equal to or less than a negative threshold value, the sum value may be substituted with 1, when a sum value is equal to or more than a positive threshold value, the sum value may be substituted with 0, when a sum value is a value corresponding to neither of the aforementioned cases, the sum value may be substituted with 2.

Table 3 430 may show only sum values selected for the calculation of an average value. Here, the selected sum values may comprise fixed or predictable values. A sum value of sensing values in a specific signal section may be fixed. In a case when sensing values, forming a pair, respectively in two different signal sections are complementary, the corresponding sum values may be predictable. Pairs of segments respectively having the same patterns in table 3 430 may represent signal sections having sum values complementary to each other.

Table 4 440 may show deviations, calculated based on the selected sum values, in segments corresponding to the signal sections respectively having the selected sum values. The deviations may be calculated in signal sections having fixed or predictable sum values in table 3 430.

The touch sensing device 140 may calculate a threshold value based on tables 1 to 4 (410-440) as follows.

The touch sensing device 140 may select fixed or predictable sum values as shown in table 3 430 and average the selected sum values. The touch sensing device 140 may obtain −9 (=(26+20−41−43+25−40+33−53)/8) as an average value (AvgValue).

The touch sensing device 140 may calculate deviations for respective touch areas as shown in table 4 440. The touch sensing device 140 may obtain 35 (=26−(−9)), 29 (=20−(−9)), −32 (=−41−(−9)), −34(=−43−(−9)), 34(=25−(−9)), −31 (=−40−(−9)), 42 (=33−(−9)), and −44 (=−53−(−9)) as the deviations (StdValue).

The touch sensing device 140 may calculate a threshold value using an average of absolute values of positive deviations and absolute values of negative deviations. The touch sensing device may obtain 140 (=35+29+34+42) as a sum of the positive deviations (PosSum) and −141 (=−32−34−31−44) as a sum of the negative deviations (NegSum) and obtain 17 (=(140−(−141))/16) as the threshold value.

The touch sensing device 140 may calculate, using the threshold value, a first threshold value (PosTh) having a positive value and a second threshold value (NegTh) having a negative value. The touch sensing device 140 may obtain 8 (=−9+17) as the first threshold value and −26(=−9−17) as the second threshold value.

Figure 5:
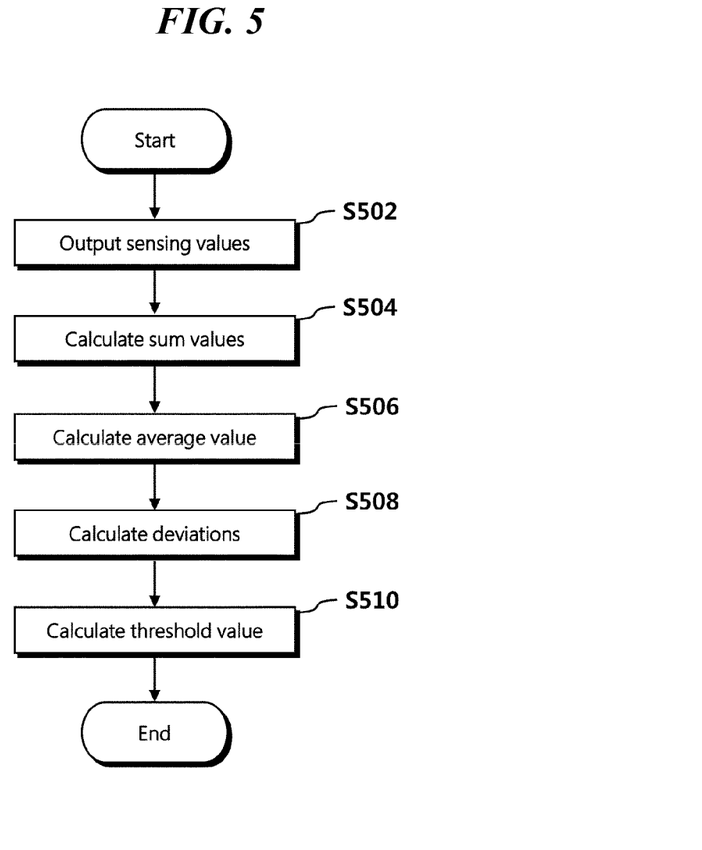
FIG. 5 is a flow diagram illustrating a calculation of a threshold value for a touch sensing device's sensing a hovering active pen according to an embodiment.

FIG. 5 is a flow diagram illustrating a calculation of a threshold value for a touch sensing device's sensing a hovering active pen.

Referring to FIG. 5, the sensing circuit 220 of the touch sensing device 140 may output a sensing value including information of the active pen (S502). The sensing value may vary depending on the intensity of a downlink signal of the active pen. Here, the sensing value may be generated while the active pen hovers.

The summing up circuit 230 of the touch sensing device 140 may receive a plurality of sensing values of a plurality of touch electrodes included in one touch area and calculate a sum value for the one touch area by summing up the plurality of sensing values (S504). Since a sensing value may be positive or negative, a sum value may be positive or negative depending on sensing values.

The average value calculating circuit 240 of the touch sensing device 140 may obtain a plurality of sum values for a plurality of signal sections and calculate an average value 240 by averaging the plurality of sum values (S506). The average value calculating circuit 240 may obtain the average value using all positive sum values and negative sum values. The average value calculating circuit 240 may use the same number of the positive sum values and the negative sum values. The sum values used for calculating the average value may be fixed or predictable.

The deviation calculating circuit 250 of the touch sensing device 140 may calculate deviations (S508) between the respective sum values and the average value. The deviation calculating circuit 250 may obtain positive deviations having positive values and negative deviations having negative values.

The threshold value calculating circuit 260 of the touch sensing device 140 may calculate a threshold value using the deviations (S510). The threshold value calculating circuit 260 may obtain the threshold value using an average of a sum of absolute value of the positive deviations and a sum of absolute values of the negative deviations. In addition, the threshold value calculating circuit 260 may calculate a first threshold value by adding up the average value and the threshold value and a second threshold value by subtracting the threshold value from the average value.

The controlling circuit 270 of the touch sensing device 140 may receive at least one threshold value and compare the at least one threshold value with a sensing value of the active pen so as to determine a touch or the proximity of the active pen 10. The controlling circuit 270 may use the first threshold value for the positive sensing values and use the second threshold value for the negative sensing values.

In addition to the effects of the present disclosure as mentioned above, additional advantages and features of the present disclosure will be clearly understood by those skilled in the art from the above description of the present disclosure.

It will be apparent to those skilled in the art that the present disclosure described above is not limited by the above-described embodiments and the accompanying drawings and that various substitutions, modifications, and variations can be made in the present disclosure without departing from the spirit or scope of the disclosures. Consequently, the scope of the present disclosure is defined by the accompanying claims, and it is intended that all variations or modifications derived from the meaning, scope, and equivalent concept of the claims fall within the scope of the present disclosure.

What is claimed is:

1. A touch sensing device receiving information of an active pen, comprising:
   a sensing circuit to output sensing values of respective touch electrodes for a downlink signal of the active pen;
   a summing up circuit to calculate a sum value by summing up a plurality of the sensing values;
   an average value calculating circuit to calculate an average value by averaging a plurality of sum values respectively calculated in different signal sections;
   a deviation calculating circuit to calculate deviations between the plurality of sum values and the average value;
   a threshold value calculating circuit to calculate at least one threshold value using the deviations and the average value; and
   a controlling circuit to identify a value of the downlink signal in each signal section based on a comparison between each sum value and the at least one threshold value and to identify the information of the active pen using signal values in a plurality of signal sections,
   wherein the average value calculating circuit calculates the average value using the sum values in the signal sections having predictable signal values and the predictable signal values correspond to sensing values which are complementary to each other, respectively in two different signal sections.

2. The touch sensing device of claim 1, wherein the sensing circuit outputs the sensing values when the active pen hovers.

3. The touch sensing device of claim 1, wherein the at least one threshold value comprises a first threshold value which is positive and a second threshold value which is negative.

4. The touch sensing device of claim 3, wherein the threshold value calculating circuit calculates a threshold deviation value using an average of absolute values of the deviations and calculates the first threshold value by summing up the average value and the threshold deviation value.

5. The touch sensing device of claim 3, wherein the threshold value calculating circuit calculates a threshold deviation value using an average of absolute values of the deviations and calculates the second threshold value by obtaining a difference between the average value and the threshold deviation value.

6. The touch sensing device of claim 1, wherein the deviations comprise positive deviations having positive values and negative deviations having negative values and the threshold value calculating circuit calculates the at least one threshold value by using an average of absolute values of the positive deviations and absolute values of the negative deviations.

7. The touch sensing device of claim 1, wherein the sum values comprise positive sum values which are positive and negative sum values which are negative and the average value calculating circuit calculates the average value by averaging a same numbers of positive sum values and negative sum values.

8. A touch sensing system comprising:
   a panel on which touch electrodes are disposed;
   an active pen touching or approaching the panel; and
   a touch sensing device to output sensing values of the touch electrodes for a downlink signal of the active pen and to identify a value of the downlink signal using the sensing values and at least one threshold value,
   wherein the touch sensing device calculates a sum value by summing up a plurality of sensing values and compares the sum value and the at least one threshold value so as to identify the value of the downlink signal,
   wherein the touch sensing device calculates an average value by averaging a plurality of sum values, calculates deviations between the plurality of sum values and the average value, and calculates at least one threshold value according to an average of the deviations, and
   wherein the touch sensing device calculates the average value using the sum values in the signal sections having predictable signal values and the predictable signal values correspond to sensing values which are complementary to each other, respectively in two different signal sections.

9. The touch sensing system of claim 8, wherein the at least one threshold value comprises a first threshold value which is positive and a second threshold value which is negative.

10. The touch sensing system of claim 8, wherein the active pen hovers over the panel.

11. The touch sensing system of claim 8, wherein the touch electrodes are disposed in a form of a matrix so as to form a plurality of touch areas.

12. The touch sensing system of claim 8, wherein the plurality of sum values are respectively obtained in different signal sections.

13. The touch sensing system of claim 8, wherein the touch sensing device calculates the sum value by summing up sensing values of N (N is a natural number, which is 2 or greater) adjacent touch electrodes.

* * * * *